(12) United States Patent
Chou et al.

(10) Patent No.: US 11,526,228 B1
(45) Date of Patent: Dec. 13, 2022

(54) METHOD FOR MONITORING AN OPERATION CONDITION OF AN INTERACTIVE INFORMATION SYSTEM

(71) Applicant: FLYTECH TECHNOLOGY CO., LTD., Taipei (TW)

(72) Inventors: Li-Chun Chou, Taipei (TW);
Shui-Chin Tsai, Taipei (TW);
Yu-Cheng Lin, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/493,664

(22) Filed: Oct. 4, 2021

(30) Foreign Application Priority Data

May 26, 2021 (TW) .................................. 110119004

(51) Int. Cl.
*G06F 3/041* (2006.01)
*G06F 11/26* (2006.01)
*G06F 11/36* (2006.01)

(52) U.S. Cl.
CPC ............ *G06F 3/0416* (2013.01); *G06F 11/26* (2013.01); *G06F 11/366* (2013.01)

(58) Field of Classification Search
None
See application file for complete search history.

(56) References Cited

U.S. PATENT DOCUMENTS

| 10,824,774 B2 * | 11/2020 | Santarone | ............... G06T 17/05 |
| 2022/0036302 A1 * | 2/2022 | Cella | .................... G06Q 10/083 |

* cited by examiner

*Primary Examiner* — Stephen T. Reed
(74) *Attorney, Agent, or Firm* — Hamre, Schumann, Mueller & Larson, P.C.

(57) ABSTRACT

A method for monitoring an operation condition of an interactive information system is provided. The interactive information system includes a touch panel and a touch control unit, and executes a resident scanning program to detect whether a hardware-related issue or a software-related issue of the touch panel or the touch control unit has occurred. When the hardware-related issue has occurred, the interactive information system downloads and executes a hardware diagnosis program to obtain a diagnosis result. When the software-related issue has occurred, the interactive information system downloads and executes a software adjustment program to resolve the software-related issue.

9 Claims, 2 Drawing Sheets

METHOD FOR MONITORING AN OPERATION CONDITION OF AN INTERACTIVE INFORMATION SYSTEM

CROSS-REFERENCE TO RELATED APPLICATION

This application claims priority of Taiwanese Invention Patent Application No. 110119004, filed on May 26, 2021.

FIELD

The disclosure relates to a monitoring method, and more particularly to a method for monitoring an operation condition of an interactive information system which may be a point-of-sale system, a point of service system, electronics in the point of sale system, an electronic cash register, an electronic ordering system, a kiosk system, etc., but is not limited to those disclosed herein.

BACKGROUND

An interactive information system, including, but limited to a point-of-sale system, a point of service system, electronics in the point of sale system, an electronic cash register, an electronic ordering system or a kiosk system, is a computer terminal with specialized hardware and software that provides access to information and applications for communication, commerce, entertainment, education, medical service, or other remote functionalities. An interactive information system usually includes a touch panel, a processing unit, a touch control unit, and other peripheral devices, such as a keyboard, a barcode scanner, a credit card machine, a receipt printer, etc. The touch control unit may be, for example, a control chip, is electrically connected to the touch panel to detect touch operations on the touch panel, and generates a panel signal in response to the touch operations detected thereby. The processing unit may be, for example, a microcontroller (MCU), and is electrically connected to the touch control unit to receive the panel signal and control other peripheral devices accordingly.

Touch panels usually use resistive, capacitive, or infrared touch technologies. For example, touch panels that use projected capacitive touch (PCT) technology are more likely to be affected by internal variations in the device or environmental interference in external surroundings, resulting in inability of a cash register system in use (i.e., the interactive information system) to operate normally.

SUMMARY

Therefore, an object of the disclosure is to provide a method to detect an operation condition of an interactive information system.

According to the disclosure, a method for automatically monitoring an operation condition of an interactive information system is provided. In some embodiments, the method may also take actions that correspond to different abnormal conditions, or that restore the abnormal conditions. The interactive information system includes a touch panel, a processing unit and a touch control unit, and the method includes steps of: A) by the processing unit, downloading a resident scanning program from a cloud server; B) by the processing unit, executing the resident scanning program to detect whether a hardware-related issue of one of the touch panel and the touch control unit has occurred, or whether a software-related issue of the touch panel has occurred; C) by the processing unit, upon determining that the hardware-related issue has occurred, downloading a hardware diagnosis program from the cloud server, executing the hardware diagnosis program to obtain a diagnosis result with respect to functionality of hardware, and uploading the diagnosis result to the cloud server; and D) by the processing unit, upon determining that the software-related issue has occurred, determining which one of multiple predefined software-related conditions the software-related issue corresponds to, downloading, from the cloud server, a software adjustment program that corresponds to said one of the predefined software-related conditions thus determined, and executing the software adjustment program to perform an operation that corresponds to said one of the predefined software-related conditions thus determined, so as to resolve the software-related issue.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
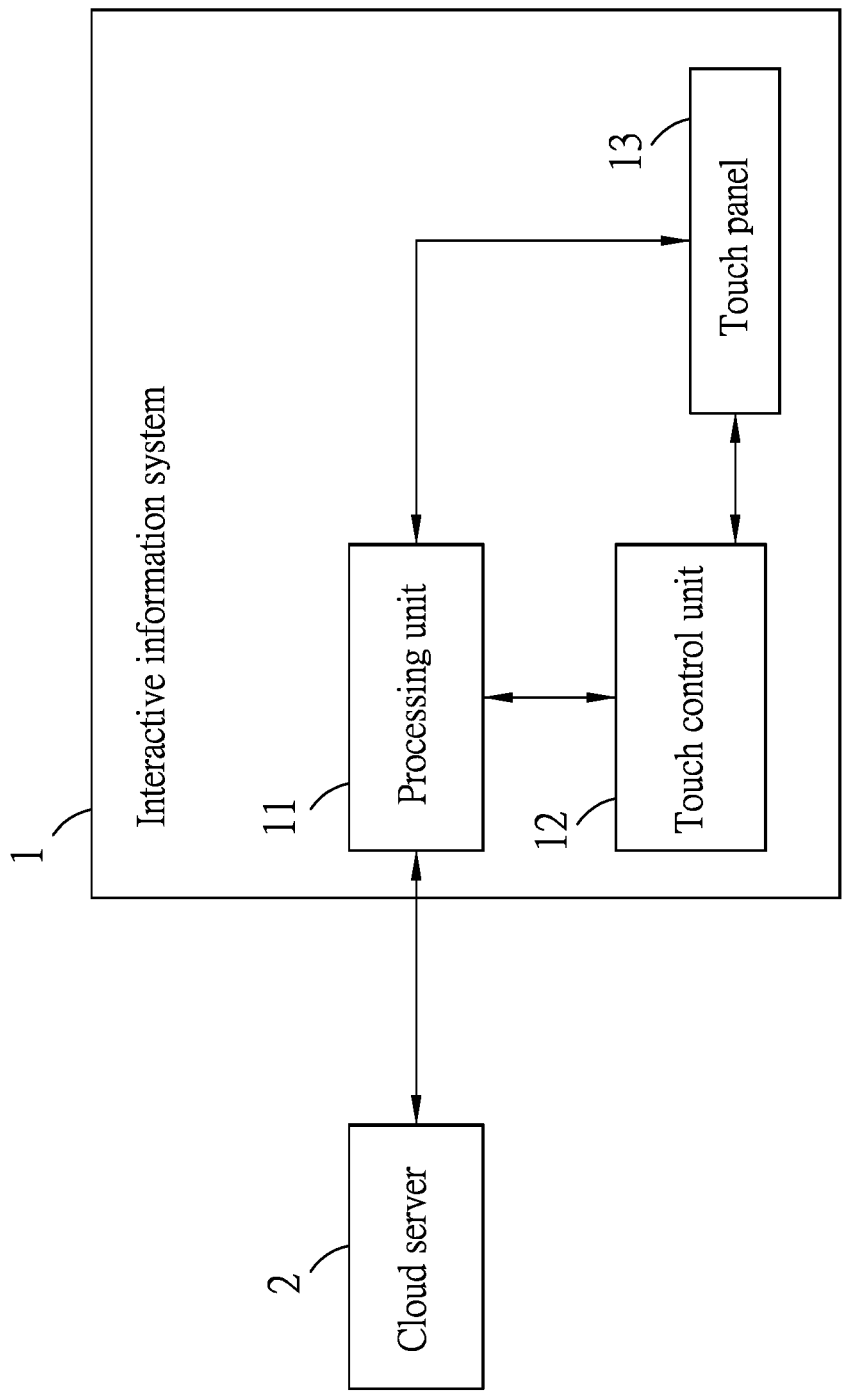
FIG. 1 is a block diagram illustrating an interactive information system and a cloud server that cooperate to implement an embodiment of a method for monitoring an operation condition of the interactive information system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
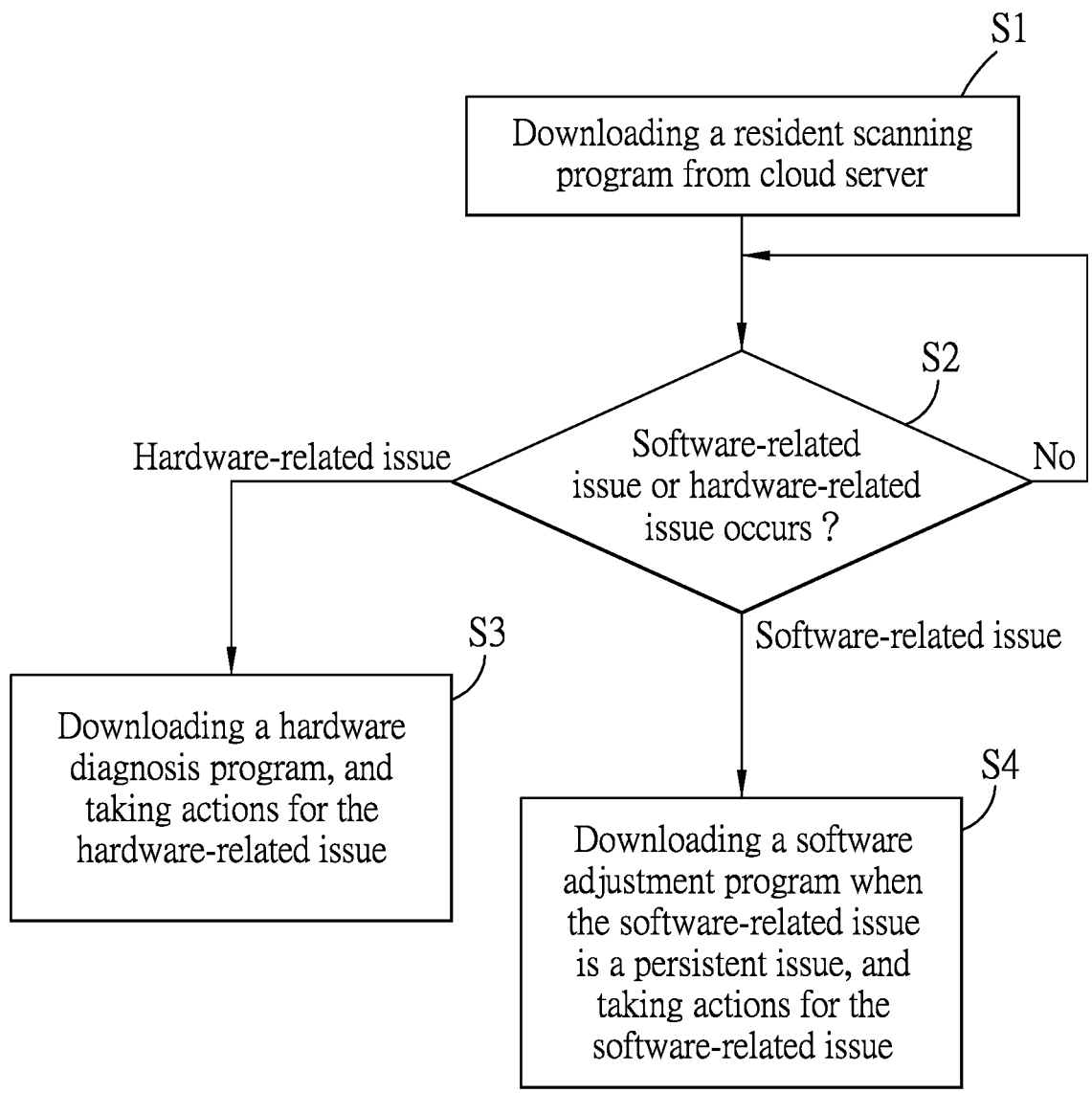
FIG. 2 is a flow chart illustrating the embodiment.

Referring to FIGS. 1 and 2, an embodiment of a method for monitoring an operation condition of an interactive information system 1 is provided. The interactive information system 1 includes a touch panel 13, a processing unit 11, a touch control unit 12, and other peripheral devices (not shown), such as a keyboard, a barcode scanner, a credit card machine, a receipt printer, etc. The touch control unit 12 may be, for example, a control chip, and is electrically connected to the touch panel 13 to detect electric charges at multiple positions of the touch panel 13, so as to generate a panel signal in response to the electric charges detected thereby. The processing unit 11 may be, for example, a microcontroller unit (MCU), and is electrically connected to the touch control unit 12 for receiving the panel signal therefrom, and controls operation of the peripheral devices based on the panel signal. The processing unit 11 is further electrically connected to the touch panel 13 for controlling display on the touch panel 13. In this embodiment, the touch panel 13 uses the PCT technology, but this disclosure is not limited in this respect.

In step S1, when the processing unit 11 establishes connection with a cloud server 2 for the first time (e.g., the interactive information system 1 boots up and establishes connection with the cloud server 2 for the first time after being installed in a store), the processing unit 11 transmits installation information of the interactive information system 1 to the cloud server 2, so as to make the cloud server 2 provide a resident scanning program that corresponds to the interactive information system 1 for download by the processing unit 11. For example, the cloud server 2 may provide service to multiple interactive information systems 1 (only one interactive information system 1 is shown in FIG. 1), and the installation information of an individual interactive information system 1 may include at least one of a model number, a serial number, a setting configuration, a region or a country where the interactive information system 1 is installed, purchaser information, etc., so the cloud server 2 can provide corresponding resident scanning program to each interactive information system 1.

In step S2, the processing unit 11 executes the resident scanning program every time the interactive information system 1 is turned on. The resident scanning program is executed to detect whether a hardware-related issue of the touch control unit 12 and/or the touch panel 13 (e.g., a touch screen glass) has occurred, and/or whether a software-related issue of the touch panel 13 has occurred. In addition, the processing unit 11 also executes the resident scanning program immediately after successfully downloading and installing the resident scanning program.

In detail, the touch panel 13 is defined to have multiple coordinate sets that correspond to different positions on the touch panel 13, and the touch control unit 12 detects electric charges at the coordinate sets, so as to generate the panel signal that indicates, with respect to each of the coordinate sets, a charge value that represents a charge amount at one of the different positions of the touch panel 13 which corresponds to the coordinate set. In this embodiment, the touch panel 13 has (X×Y) number of coordinate sets that form an X-by-Y array, and a normal range of the charge value is assumed to be between 0 and 15 in this embodiment. It is noted that the charge value may be a pure number that is defined by the developer of this system to represent a level of the charge amount, as opposed to employing a commonly used measurement standard for electric charges, such as measurement in units of coulomb. During the development of the interactive information system 1, the charge value may be set to a base value that is smaller than a first threshold value when the touch panel 13 is not touched by any external objects. In this embodiment, the base value is exemplified as zero, and the first threshold value is exemplified as three. When the panel signal indicates that, for a two-dimensional area of the touch panel 13, the charge values that correspond to the two-dimensional area have all continued to be not equal to the base value for a first predetermined length of time (e.g., ten seconds), the processing unit 11 determines that the touch panel 13 has the software-related issue. For example, the two-dimensional area may correspond to five adjacent coordinate sets that cooperatively form a cross, where the charge values that respectively correspond to the upper, lower, left, right and central coordinate sets are 5, 3, 4, 5 and 13, respectively, and the processing unit 11 may determine that the software-related issue has occurred when the charge values for these five coordinate sets continue to be non-zero for the first predetermined length of time. When the panel signal indicates that, for a straight line (either a horizontal line or a vertical line) of the touch panel 13, some of the charge values that correspond to the straight line have continued to be not equal to the base value for a second predetermined length of time (e.g., one hour), the processing unit 11 determines that the touch panel 13 has the hardware-related issue. The second predetermined length of time may be either equal to or different from the first predetermined length of time. In some embodiments, for a straight line of the touch panel 13, when two or more charge values that correspond to the straight line have continued to be not equal to the base value for the second predetermined length of time, the processing unit 11 determines that the touch panel 13 has the hardware-related issue. For example, assuming that the charge values corresponding to the seventeenth row of the X-by-Y array are 2, 4, 1, 4, 0, 2, 3, 5, 0, 2, 3, 2, . . . , 3, 1, 4, . . . , the processing unit 11 may determine that the hardware-related issue has occurred when the abovementioned charge values remain for the second predetermined length of time (e.g., the channel-17 of the hardware circuit that corresponds to the seventeenth row of the X-by-Y array may be damaged).

In step S3, upon determining that the hardware-related issue has occurred, the processing unit 11 downloads a hardware diagnosis program from the cloud server 2. After the download is completed, the processing unit 11 controls the touch panel 13 to display a notification message advising that the touch panel 13 is not to be touched during execution of the hardware diagnosis program in order to avoid failure of diagnosis, and indicating that the interactive information system 1 is unable to be used as normal during execution of the hardware diagnosis program. A user, such as a store manager, may press or click a confirm button to agree to the execution of the hardware diagnosis program after reading the notification, so as to generate, for the processing unit 11, an instruction of confirming to execute the hardware diagnosis program. Upon receipt of the instruction through the touch panel 13 and the touch control unit 12, the processing unit 11 executes the hardware diagnosis program to obtain a diagnosis result with respect to functionality of various hardware (for example but not limited to, hardware in the touch panel 13 and/or the touch control unit 12), and uploads the diagnosis result to the cloud server 2. The hardware diagnosis program may be configured to, for example but not limited to, perform calibration on hardware components to correct signal errors due to long-term use of the interactive information system 1, inspect whether an unexpected open circuit exists in hardware circuits, inspect whether an unexpected short circuit exists in hardware circuits, and/or check signal integrity of touch signals generated by the touch panel 13 to confirm whether there is a foreign matter staying on an active area of the touch panel 13.

The cloud server 2 may classify the hardware-related issue based on the diagnosis result, and then transmit a classification result to the processing unit 11. When the classification result indicates that the hardware-related issue is a minor abnormality, the cloud server 2 stores an event record that is related to the diagnosis result. When the classification result indicates that the hardware-related issue is a severe abnormality, the processing unit 11 that executes the resident scanning program generates and sends a warning message to the cloud server 2, so the cloud server 2 or a customer service staff can send the warming message to the user of the interactive information system 1 via email, text messaging or phone call. When the cloud server 2 determines that the hardware-related issue is neither a minor abnormality nor a severe abnormality as defined by the system developer, it may be the case that no specific action is to be taken in response to such a classification result in some embodiments.

For example, when the processing unit 11 determines, based on the panel signal generated by the touch control unit 12, that the hardware-related issue has occurred and any of said some of the charge values that correspond to the straight line is greater than or equal to the first threshold value (e.g., three in this example) and each of said some of the charge values that correspond to the straight line is smaller than a second threshold value (e.g., seven in this example) that is greater than the first threshold value, the cloud server 2 determines that the hardware-related issue is a minor abnormality. When the processing unit 11 determines, based on the panel signal generated by the touch control unit 12, that the hardware-related issue has occurred and any of said some of the charge values is greater than or equal to the second threshold value, the cloud server 2 determines that the hardware-related issue is a severe abnormality.

In step S4, upon determining that the software-related issue has occurred, the processing unit 11 further determines which one of multiple predefined software-related conditions the software-related issue corresponds to. In practice, each of the predefined software-related conditions may correspond to a flag that indicates whether the touch panel 13 is in the predefined software-related condition (e.g., a flag value of the flag being a first logic value, such as a logic 1, represents that the touch panel 13 is in the predefined software-related condition). The processing unit 11 further determines whether the software-related issue is a persistent issue based on a time period that the predefined software-related conditions the software-related issue corresponds to lasts. Upon determining that the software-related issue is a persistent issue (e.g., the time period that the predefined software-related conditions the software-related issue corresponds to lasts is greater than a threshold time length), the processing unit 11 uploads a usage record of the interactive information system 1 to the cloud server 2 to make the cloud server 2 adjust, based on the usage record, a dynamic parameter of a software adjustment program to a parameter value that corresponds to said one of the predefined software-related conditions thus determined, and provide the software adjustment program for download by the processing unit 11. After downloading the software adjustment program from the cloud server 2, the processing unit 11 executes the software adjustment program to perform an operation that corresponds to said one of the predefined software-related conditions thus determined, so as to resolve the software-related issue and make the flag that corresponds to said one of the predefined software-related conditions indicate that the touch panel 13 is not in said one of the predefined software-related conditions (e.g., make the flag value of the corresponding flag return to a second logic value (e.g., a logic 0) representing that the touch panel 13 is not in said one of the predefined software-related conditions). The threshold time length is set to avoid unnecessary actions (e.g., uploading the usage record, determining the dynamic parameter of the software adjustment program, and downloading the software adjustment program) when the abnormality only occurs briefly. The usage record may include, for example, historical panel signal outputted by the touch control unit 12 by detecting the touch panel 13.

In one example, there are four predefined software-related conditions, and it is assumed that the base value is zero (the charge value that is set when the touch panel 13 is not touched by anything), and that the charge values that correspond to an area of the touch panel 13 touched by a finger will be thirteen. The first predefined software-related condition is related to a liquid drop remaining on the surface of the touch panel 13. For example, the charge values that correspond to a liquid drop region of the touch panel 13 where the liquid drop is located on the touch panel 13 is assumed to be eleven. When the processing unit 11 uses a threshold value of ten to determine whether a touch operation is performed on the touch panel 13, the liquid drop on the touch panel 13 may be misjudged as being a touch operation because the charge value of eleven is greater than the threshold value of ten. By virtue of step S4, the processing unit 11 may determine that the touch panel 13 is in the first predefined software-related condition when the charge values that correspond to the liquid drop region continue to be eleven for a predetermined period of time (e.g., five seconds, independent of the aforesaid first predetermined length of time and second predetermined length of time), and set the flag that corresponds to the first predefined software-related condition to logic 1. Once the charge values that correspond to the liquid drop region change to the base value (e.g., zero), the processing unit 11 may immediately reset the corresponding flag to logic 0. When the flag value of the corresponding flag continues to be logic 1 for a first predetermined time interval (e.g., one minute, independent of the aforesaid first predetermined length of time and second predetermined length of time), the processing unit 11 determines that the software-related issue that corresponds to the first predefined software-related condition is a persistent issue, and sends the usage record to the cloud server 2. Then, the cloud server 2 may adjust the dynamic parameter of the software adjustment program to a first parameter value that corresponds to the first predefined software-related condition so that the threshold value for determining whether a touch operation is performed on the touch panel 13 is adjusted from ten to twelve (namely, the first parameter value corresponds to an action of adjusting the threshold value from ten to twelve). After downloading and executing the software adjustment program with the adjusted dynamic parameters, the processing unit 11 will no longer misjudge the liquid drop as being a touch operation.

The second predefined software-related condition is related to a large area of the touch panel 13 being touched, such as an unintentional pressing by a palm. The charge values correspond to a palm-touched region of the touch panel 13 where the palm is in contact with the touch panel 13 are assumed to be thirteen, which is the same as the charge values induced by finger touch, and which may be misjudged as being a touch operation. By virtue of step S4, the processing unit 11 may determine that the touch panel 13 is in the second predefined software-related condition when the charge values that correspond to the palm-touched region continue to be thirteen for a predetermined period of time (e.g., five seconds, independent of the aforesaid first predetermined length of time and second predetermined length of time), and set the flag that corresponds to the second predefined software-related condition to logic 1. Once the charge values that correspond to the palm-touched region change to the base value (e.g., zero), the processing unit 11 may immediately reset the corresponding flag to logic 0. When the flag value of the corresponding flag continues to be logic 1 for a second predetermined time interval (e.g., one minute, independent of the aforesaid first predetermined length of time and second predetermined length of time), the processing unit 11 determines that the software-related issue that corresponds to the second predefined software-related condition is a persistent issue, and sends the usage record to the cloud server 2. Then, the cloud server 2 may adjust the dynamic parameter of the software adjustment program to a second parameter value that corresponds to the second predefined software-related condition so that after executing the software adjustment program with the adjusted dynamic parameters, the processing unit 11 would disregard the charge values that correspond to the palm-touched region (namely, the second parameter value corresponds to an action of disregarding the charge values that correspond to the palm-touched region). After downloading and executing the software adjustment program with the adjusted dynamic parameters, the processing unit 11 will no longer misjudge the palm touch as being a touch operation. The second predefined software-related condition and the first predefined software-related condition may be distinguished based on, for example but not limited to, that the charge values resulting in the second predefined software-related condition may be greater than the charge values resulting in the first predefined software-related condition, and that the liquid drop and human's unintentional touch may result in different patterns of charge distribution.

The third predefined software-related condition is related to idling of the touch panel 13, i.e., the touch panel 13 is not touched by anything for a relatively long period of time. By virtue of step S4, the processing unit 11 may determine that the touch panel 13 is in the third predefined software-related condition when all of the charge values continue to be the base value (e.g., zero) for a predetermined period of time (e.g., five seconds, independent of the aforesaid first predetermined length of time and second predetermined length of time), and set the flag that corresponds to the third predefined software-related condition to logic 1. Once any of the charge values changes to be greater than the base value (e.g., zero), the processing unit 11 may immediately reset the corresponding flag to logic 0. When the value of the corresponding flag continues to be logic 1 for a third predetermined time interval (e.g., the third predetermined time interval may have a length ranging from ten minutes to thirty minutes, or may be defined by users, noting that the third predetermined time interval is independent of the aforesaid first predetermined length of time and second predetermined length of time), the processing unit 11 determines that the software-related issue that corresponds to the third predefined software-related condition is a persistent issue, and sends the usage record to the cloud server 2. Then, the cloud server 2 may adjust the dynamic parameter of the software adjustment program to a third parameter value that corresponds to the third predefined software-related condition so that after executing the software adjustment program with the adjusted dynamic parameters, the processing unit 11 would switch to operating in a power-saving mode (namely, the third parameter value corresponds to an action of switching the processing unit 11 to operating in the power-saving mode). After downloading and executing the software adjustment program with the adjusted dynamic parameters, the processing unit 11 switches to operating in the power-saving mode.

The fourth predefined software-related condition is related to electrostatic trigger. In one example, it is assumed that the electrostatic charges induced on the touch panel 13 may result in the charge values of eleven at an electrostatic-charge-induced region of the touch panel 13 where the electrostatic charges are applied. When the processing unit 11 uses a threshold value of ten to determine whether a touch operation is performed on the touch panel 13, the electrostatic trigger on the touch panel 13 may be misjudged as being a touch operation because the charge values of eleven are greater than the threshold value of ten. By virtue of step S4, the processing unit 11 may determine that the touch panel 13 is in the fourth predefined software-related condition when the charge values that correspond to the electrostatic-charge-induced region become eleven in an extremely short time (e.g., shorter than a predetermined period of time, such as 200 ms), and set the flag that corresponds to the fourth predefined software-related condition to logic 1. Once the charge values that correspond to the electrostatic-induced region change to the base value (e.g., zero), the processing unit 11 may immediately reset the corresponding flag to logic 0. When the flag value of the corresponding flag becomes logic 1 several times within a fourth predetermined time interval (e.g., more than twice within twenty-four hours, noting that the fourth predetermined time interval is independent of the aforesaid first predetermined length of time and second predetermined length of time), the processing unit 11 determines that the software-related issue that corresponds to the fourth predefined software-related condition is a persistent issue, and sends the usage record to the cloud server 2. Then, the cloud server 2 may adjust the dynamic parameter of the software adjustment program to a fourth parameter value that corresponds to the fourth predefined software-related condition so that the threshold value is adjusted from ten to thirteen (namely, the fourth parameter value corresponds to an action of adjusting the threshold value from ten to thirteen). After downloading and executing the software adjustment program with the adjusted dynamic parameters, the processing unit 11 will no longer misjudge the electrostatic trigger as being a touch operation.

Briefly, the processing unit 11 may determine one of the predefined software-related conditions for the touch panel 13 based on a distribution of the charge values (e.g., determining whether the distribution of the charge values corresponds to one of multiple predetermined distribution types), so as to determine or change the flag value of the flag that corresponds to the determined one of the predefined software-related conditions. Then, upon determining that the software-related issue is a persistent issue, the processing unit 11 sends the usage record to the cloud server 2, so the cloud server 2 can adjust the dynamic parameters based on the usage record.

Furthermore, the processing unit 11 causes the touch panel 13 of the interactive information system 1 to provide/display a first light of a first color (e.g., a green light symbol) upon determining that none of the hardware-related issue and the software-related issue has occurred, to provide/display a second light of a second color (e.g., a purple light symbol) upon determining that the hardware-related issue or the software-related issue has occurred, and to provide/display a third light of a third color (e.g., an orange light symbol) when the processing unit 11 is executing the hardware diagnosis program or the software adjusting program. When the cloud server 2 determines, based on the diagnosis result, that the hardware-related issue is a severe abnormality, the cloud server 2 sends an instruction to the processing unit 11 so that the processing unit 11 makes the touch panel 13 of the interactive information system 1 provide/display a fourth light of a fourth color (e.g., a red light symbol). The first light to the fourth light are used to notify the user of an operation status of the interactive information system 1. Alternatively, the interactive information system 1 may include an indicator light, instead of using the touch panel 13, to directly emit the lights of the first to fourth colors, so as to make the user become aware of the operation status of the interactive information system 1.

In summary, the cloud server 2 can provide the resident scanning program that corresponds to the interactive information system 1 based on the installation information. The interactive information system 1 downloads and executes the resident scanning program to preliminarily determine whether the software-related issue or the hardware-related issue has occurred, and downloads and executes a corresponding program (the software adjustment program or the hardware diagnosis program) when the software-related issue or the hardware-related issue has occurred depending on the type of the issue, so as to make a detailed diagnosis and take corresponding actions and/or perform corresponding restorations for resolving the abnormality that had occurred with respect to the touch panel 13 and/or the touch control unit 12 of the interactive information system 1 in a short time.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for monitoring an operation condition of an interactive information system that includes a touch panel, a processing unit and a touch control unit, comprising steps of:
   A) by the processing unit, downloading a resident scanning program from a cloud server;
   B) by the processing unit, executing the resident scanning program to detect whether a hardware-related issue of one of the touch panel and the touch control unit has occurred, or whether a software-related issue of the touch panel has occurred;
   C) by the processing unit, upon determining that the hardware-related issue has occurred, downloading a hardware diagnosis program from the cloud server, executing the hardware diagnosis program to obtain a diagnosis result with respect to functionality of hardware, and uploading the diagnosis result to the cloud server; and
   D) by the processing unit, upon determining that the software-related issue has occurred, determining which one of multiple predefined software-related conditions the software-related issue corresponds to, downloading, from the cloud server, a software adjustment program that corresponds to said one of the predefined software-related conditions thus determined, and executing the software adjustment program to perform an operation that corresponds to said one of the predefined software-related conditions thus determined, so as to resolve the software-related issue.

2. The method of claim 1, wherein step A) includes:
   transmitting installation information of the interactive information system to the cloud server when the interactive information system establishes connection with the cloud server for a first time, so as to make the cloud server provide, to the processing unit, the resident scanning program that corresponds to the interactive information system.

3. The method of claim 1, wherein, in step B), the processing unit executes the resident scanning program every time the interactive information system is turned on.

4. The method of claim 1, wherein step B) includes:
   by the processing unit, based on a panel signal generated by the touch control unit, determining whether the hardware-related issue or the software-related issue has occurred;
   wherein the touch panel is defined to have multiple coordinate sets that correspond to different positions on the touch panel, and the panel signal indicates, for each of coordinate sets, a charge value that represents a charge amount at one of the different positions of the touch panel which corresponds to the coordinate set;
   wherein the charge value of each of the coordinate sets is configured to be a base value when the touch panel is not being operated by touch operation; and
   wherein step B) further includes:
      by the processing unit, for a two-dimensional area of the touch panel, when the panel signal indicates that some of the charge values that correspond to the two-dimensional area have all continued to be not equal to the base value for a first predetermined length of time, determining that the touch panel has the software-related issue; and
      by the processing unit, for a straight line of the touch panel, when the panel signal indicates that some of the charge values that correspond to the straight line have continued to be not equal to the base value for a second predetermined length of time, determining that the touch panel has the hardware-related issue.

5. The method of claim 1, wherein step C) includes:
   by the processing unit, after downloading the hardware diagnosis program from the cloud server, controlling the touch panel to display a notification message advising that the touch panel is not to be touched and indicating that the interactive information system is unable to be used as normal during execution of the hardware diagnosis program; and
   by the processing unit, upon receipt of a first instruction of confirming to execute the hardware diagnosis program through the touch panel and the touch control unit, executing the hardware diagnosis program.

6. The method of claim 5, further comprising, after step C), steps of:
   E) by the cloud server, upon determining that the hardware-related issue is related to a minor abnormality based on the diagnosis result, storing an event record that is related to the diagnosis result; and
   F) by the processing unit that is executing the resident scanning program, when the cloud server determines that the hardware-related issue is related to a severe abnormality based on the diagnosis result, generating a warning message.

7. The method of claim 6, further comprising a step of:
   G) by the processing unit, causing the interactive information system to provide a first light of a first color upon determining that the hardware-related issue or the software-related issue has not occurred, to provide a second light of a second color upon determining that the hardware-related issue or the software-related issue has occurred, and to provide a third light of a third color when the processing unit is executing one of the hardware diagnosis program and the software adjusting program; and
   H) by the cloud server, sending a second instruction to the processing unit to make the interactive information system provide a fourth light of a fourth color when determining that the hardware-related issue is related to the severe abnormality.

8. The method of claim 1, wherein, in step D), the processing unit downloads and executes the software adjustment program after the processing unit determines, based on a time period that said one of the predefined software-related conditions the software-related issue corresponds to lasts, that the software-related issue is a persistent issue.

9. The method of claim 8, wherein step D) includes:
by the processing unit, upon determining that the software-related issue is a persistent issue, uploading a usage record of the interactive information system to the cloud server to make the cloud server determine dynamic parameters of the software adjustment program based on the usage record, and provide the software adjustment program for download by the processing unit;
wherein the usage record includes a panel signal generated by the touch control unit detecting the touch panel in a previous period of time.

\* \* \* \* \*